Jan. 26, 1971  R. E. PIERCE  3,557,398

WATER SPORT VEHICLE

Filed May 5, 1969

INVENTOR
ROBERT E. PIERCE
BY
John H. Crowe
AGENT

United States Patent Office 3,557,398
Patented Jan. 26, 1971

3,557,398
WATER SPORT VEHICLE
Robert E. Pierce, 11189 Royal Palm Blvd.,
Riverside, Calif. 92505
Filed May 5, 1969, Ser. No. 821,657
Int. Cl. A63c 15/02
U.S. Cl. 9—310         10 Claims

ABSTRACT OF THE DISCLOSURE

A water sport vehicle having a lightweight wheel with a buoyant tire and fitted with a pair of water skis designed to accommodate a rider in standing position astraddle the wheel. The vehicle can be pulled through the water, with a rider, until a speed is reached at which it rolls along the surface of the water on the wheel. The skis are positioned to ride clear of the surface when held horizontally, and pivotally mounted to permit the rear end of each to be dipped into the water, for braking and turning purposes, when the vehicle is in motion.

BACKGROUND OF THE INVENTION

This invention relates to a novel water sport vehicle, and more particularly to such a vehicle adapted to roll across the surface of the water on a buoyant wheel when towed by a speedboat.

Various water sport vehicles adapted to skim across water surfaces while being towed by a motor boat have been proposed. Of these devices, the simplest are water skis, and most others of which I am aware have employed the water-ski principle, at least to the extent of providing contact with the water surface through water skis, runners, or members of like character adapted to slide over the surface in frictional contact therewith. The water sport vehicles of this invention are designed to travel over water surfaces on rolling wheels, thereby employing a new principle of surface contact, and providing a unique kind of water locomotion and attendant thrills and sensations unlike those experienced with conventional water skis or vehicles which travel on runners.

SUMMARY OF THE INVENTION

The unique water sport vehicle of this invention, in its preferred form, consists essentially of a buoyant wheel with water skis mounted either side thereof, and cooperating structural, and other, parts designed to permit the vehicle to be pulled across the water by a motor boat with a rider standing on the skis astraddle the wheel. The vehicle has a towbar, to which a towrope from the motor boat can be attached, and a handlebar with an elongate extension pivotally connected to the towbar at its forward end. The handlebar extension is mounted to move in a vertical plane about its point of pivotal connection with the towbar, an sized to permit the rider to hold onto the handlebar with both hands when the vehicle is in motion. A fender partially encloses the upper portion of the wheel of the moving vehicle, to protect the rider from spray thrown up by the wheel an permit the escape of a roostertail of water spray in the wake of the vehicle. The water skis are pivotally mounted to ride clear of the water, when held horizontally in the moving vehicle, yet permit the rider to dip the rear end of either, or both, into the water, for braking or turning purposes.

It is thus a principal object of this invention to provide a unique water sport vehicle adapted to move a standing rider across the surface of water on a rolling wheel.

It is another object of the invention to provide such a vehicle having water skis attached for use by the rider in a uniquely new and thrilling manner.

Other objects, features, and advantages of the invention will become apparent in the light of subsequent disclosures herein.

DESCRIPTION OF THE PREFERRED EMBODIMENT

Figure 3:
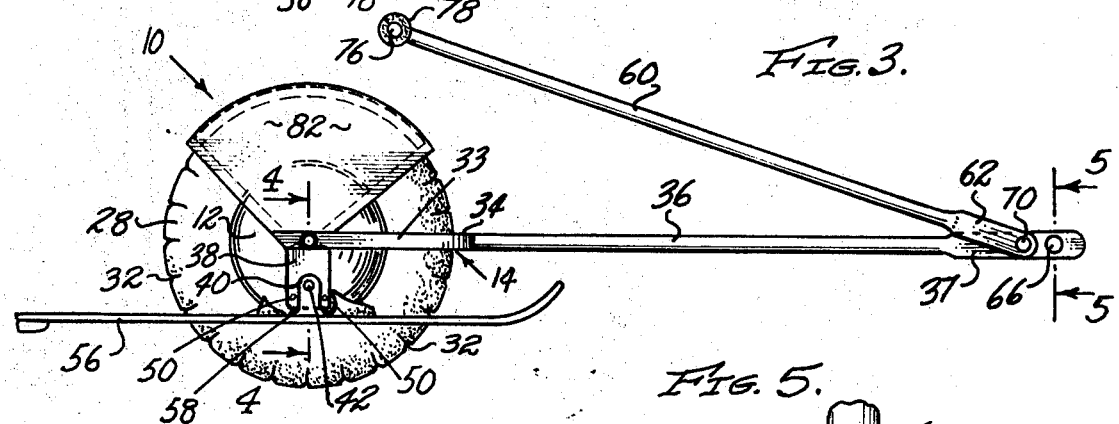
FIG. 3 is a side elevation of the vehicle.

Considering now the drawing in greater detail, there is shown generally at 10 a preferred embodiment of a water sport vehicle in accordance with this invention. Water sport vehicle 10 comprises, in combination, a lightweight wheel 12, fitted with a pneumatic tube 28, rotatably mounted on a stationary axle 16; a frame 14; a pair of water skis 56 pivotally mounted on frame 14 either side of the wheel; a towbar 36 and a handlebar 76 with an extension 60. The wheel 12 is of lightweight metal construction, and has a rim 30 on which tube 28 is mounted in the manner made clear by FIGS. 3 and 4 of the drawing. At its center, the wheel has a hollow cylindrical hub 24 into each end of which is tightly fitted a nylon bearing 26 (see FIG. 4). The axle 16 consists of an axle rod 17, having an enlarged head 18 at one end and a threaded portion or segment 21 at the other end, and a sleeve 19, frictionally fitted onto the major portion of the shank of the rod, all as illustrated in FIG. 4.

Figure 2:
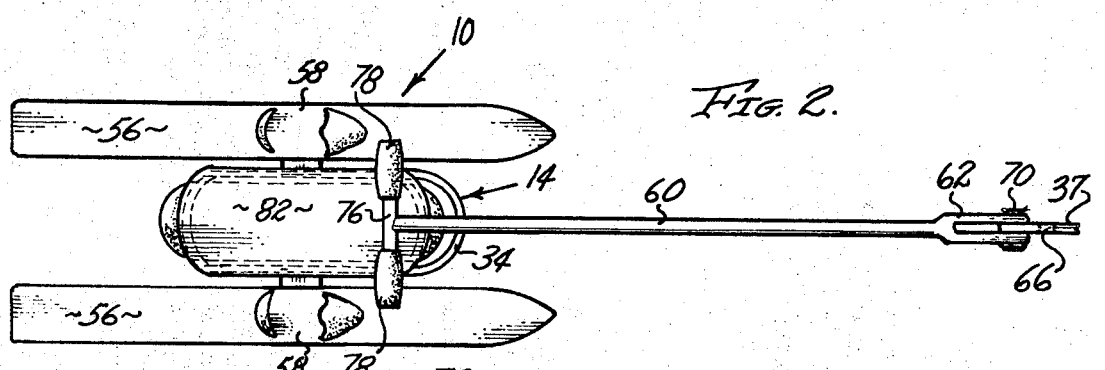
FIG. 2 is an enlarged top view of the water sport vehicle.

Vehicle frame 14 has a U-shaped segment with a pair of parallel arms 33 merging into an arcuate section 34, best seen in FIG. 2, which forms an enclosure at one end of the segment, adapted to fit around the wheel and tube in the illustrated manner, with the outer ends of its arms positioned adjacent the wheel center. The wheel and frame are fastened together with the center of the wheel between the ends of arms 33, as indicated, and each of the arms is provided with a countersunk depression 35 to accommodate axle rod 17 in the below-described manner. Depending downwardly from the outer ends of these arms, in planarly parallel relationship, are a pair of water ski hangers 38, adapted to support a pair of water ski support brackets in the manner, and for a purpose, hereinafter disclosed.

Figure 4:
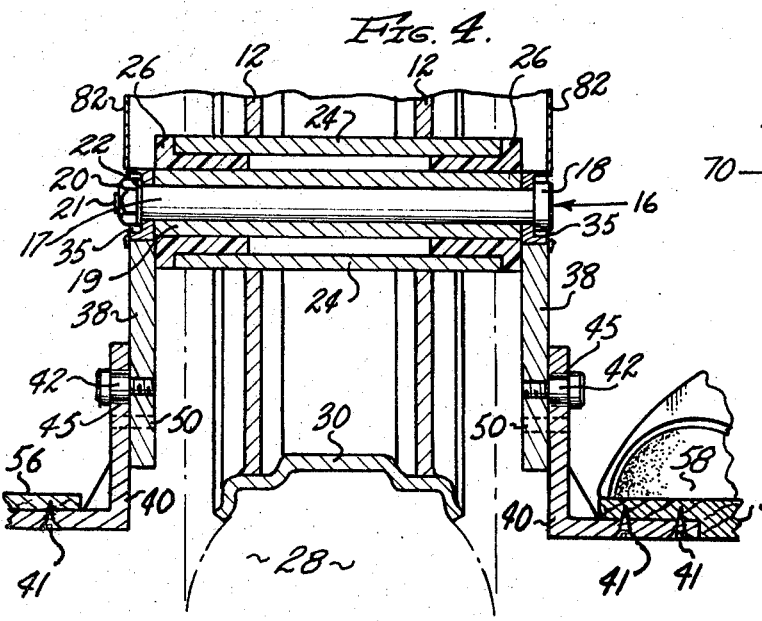
FIG. 4 is an enlarged fragmentary view of the vehicle, as seen mostly in section along line 4—4 of FIG. 3.

The lateral spacing of arms 33 of the U-shaped segment of frame 14, and ski hangers 38, is such as to permit the installation of wheel 12 therebetween, with the opposite ends of axle sleeve 19 flush against the inner surfaces of the arms, as illustrated in FIG. 4. The wheel is mounted with the sleeve aligned with the countersunk depressions 35 in frame arms 33 and axle rod 17 passing through these countersunk depressions and the hollow center of the sleeve. As FIG. 4 makes clear, the countersunk openings 35 are of identical size and shape, and adapted to receive the shaft of axle rod 17 in slidable relationship in reduced inner passageways, head 18 of the axle in one countersunk outer hollow and a lock washer and nut 20 in a second countersunk outer hollow, thereof. Axle 15 is thus fixedly secured to frame 14 of the vehicle in the manner illustrated in FIG. 4, that is, with axle rod 17 projecting through the countersunk openings 35 at each end, and its head pulled into an outer counersunk hollow forming a part of one of the opening, and the lock washer 22 and nut 20 drawn tightly onto threaded segments 21 of the axle rod and into a countersunk hollow forming a part of the other opening. This axle-fastening arrangement draws arms 33 of frame 14 tightly against the two ends of axle sleeve 19, and serves to hold the axle rod and sleeve stationary during use of the vehicle. The head and tightening nut at the two ends of the axle are almost hidden in the countersunk outer hollows of the openings 35 in the arms 33 of the vehicle frame, hence do not project outwardly from the sides of the vehicle to interfere with the legs of the rider, or otherwise constitute a safety hazard, when vehicle 10 is in motion. Mounting of the wheel in the frame of vehicle 10 in the above-described manner permits the wheel to turn around axle 16, with nylon bearings 26 in bearing relationship with sleeve 19 of the axle, and roll easily across the surface of a body of water in a manner soon to be described.

Ski hangers 38, which, as indicated above, depend downwardly, in parallel relationship, from forward portions of arms 33 of the vehicle frame, serve as support hangers for the aforesaid pair of water ski support brackets 40. The brackets 40 are of angled cross section, and are pivotally secured to the lower portions of ski hangers 38, by means of pivot pins 42, with a web, or flange, of each in vertically parallel relationship with that of the other, and a second web, or flange, projecting perpendicularly outwardly therefrom. As the drawing makes clear, the vertically disposed flanges of the support brackets swing in a vertical plane about pivot pins 42, which latter pass through receptive openings 45 therefor in the brackets, as illustrated in FIG. 4. Positioned either side of the downwardly extending edges of the vertical flange of each of the support brackets 40 is a pair of stop pins 50, threadedly anchored in ski hangers 38 in the manner illustrated in FIG. 4. The purpose of stop pins 50 is, as will be apparent, to confine the swinging movement of the ski support brackets within certain limits. The range of swinging movement of the ski support brackets is sufficient for vehicle control purposes in accordance with this invention, but adequately restrictive to prevent dangerously erratic movement of the water skis attached thereto in the below-described manner, when the vehicle is in motion.

Fixedly secured to the upper surfaces of the outwardly extending flanges of ski support brackets 40 by means of a plurality of fastening screws 41 are a pair of water skis 56. As FIGS. 1, 2, 3 and 4 of the drawing illustrate, the water skis are positioned with their foot rests 58 flanking wheel 12 at a level roughly the same as that of the bottom of its rim 30.

Figure 5:
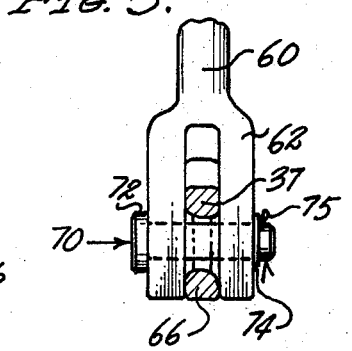
FIG. 5 is an enlarged fragmentary sectional view of a forward portion of the vehicle, taken along line 5—5 of FIG. 3.

Integrally attached to end enclosure 34 of the U-shaped segment of vehicle frame 14, so as to extend outwardly therefrom in alignment with wheel 12, is a towbar 36. Towbar 36 has a vertically flattened segment 37 at its forward end, in the front portion of which is an eyelet opening 66 adapted to receive a towrope. The handlebar extension 60 is pivotally secured to the flattened segment 37 of the towbar, in the manner best illustrated in FIG. 2, by means of a pivot pin 70, which passes through a receptive opening in the towbar to the rear of eyelet 66. To make this possible, the forward end of the handlebar extension is provided with a clevis 62, having appropriate openings to receive pivot pin 70 in the forward ends of its two arms, and the pivot pin is provided with a head 72, and fixedly secured in place by means of a washer 74 and cotter pin 75, all as illustrated in FIG. 5. The handlebar 76 is perpendicularly attached to the rear end of the handlebar extension, and fitted with a pair of handgrips 78, as best illustrated in FIG. 2. The length of handlebar extension 60 is such as to permit easy reach of the handlebar by a rider when the vehicle is in motion. As will be apparent, the pivotal connection between the handlebar extension and towbar is designed to permit up and down movement of the handlebar, yet substantially restrict its lateral movement (relative to the towbar), to give the rider optimum guidance control over the moving vehicle.

Figure 1:
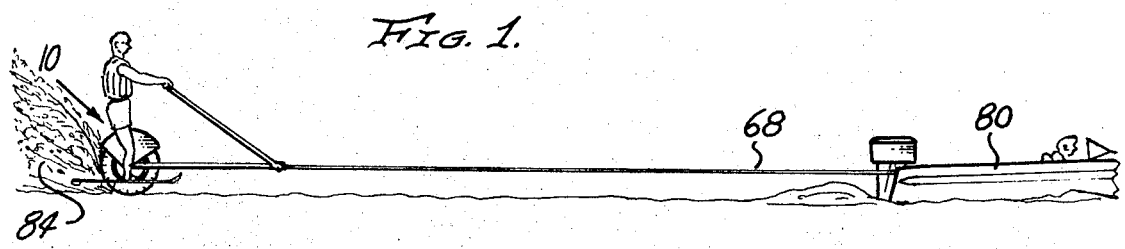
FIG. 1 is a side view of a preferred embodiment of a water sport vehicle in accordance with this invention being towed across the water, with a rider aboard, by a motor boat.

A cut-down fender 82 is secured to vehicle frame 14 so as to cover a portion of the top of wheel 12, and protect the rider from spray thrown up by tube 28 when the vehicle is moving at high speed, yet permit the scape of spray to the rear in form of a roostertail, such as illustrated at 84 in FIG. 1. Pneumatic tube 28 is similar to the innertube of an automobile tire, but molded with a plurality of transverse wringles 32 around its outer periphery to provide good traction on the water surface and guard against slippage between water and tube when the vehicle is traveling at accelerated speeds. Such wrinkles are not critically necessary, however, and may be dispensed with, if desired, within the scope of my invention.

Water sport vehicle 10 is started from shallow water, preferably by means of a power boat, with the rider standing on skis 56 astraddle its wheel and fender. The presence of the skis helps the rider to maintain his equilibrium until the vehicle reaches a speed at which its wheel has risen high enough in the water to allow said skis to clear the water surface, when disposed horizontally, as illustrated in the drawing. After the vehicle reaches this speed, hereinafter referred to as its planing speed, the wheel rides high enough in the water to roll essentially along its surface, on tube 28, with the rider standing on the skis and gripping handlebar 76 with both hands. Pivotal movement of the skis can be controlled by the rider, within the limits governed by stop pins 50 on ski hangers 38, to permit dipping of either, or both, of the heel ends of the skis into the water for braking and/or turning. It will be apparent that a rider can, by leaning his weight to one side or the other, mainpulating the skis, and, to some extent, by tilting the vehicle sideways through side pressure on the handlebar, maneuver the vehicle through a fairly wide range of movements. FIG. 1 shows a rider 86 mounted on the vehicle being towed by a motor boat 80 to which it is connected by means of a towrope 68.

The water sport vehicle of this invention has been herein described in considerable detail in order to comply with legal requirements for a full public disclosure of a least one of its forms. Such detailed disclosure is not, however, intended to unduly limit the scope of patent monopoly sought to be granted. Accordingly, while the vehicle has been illustrated and described in what is believed to be a preferred embodiment, it is emphasized that departures may be made therefrom within the scope of my invention. Exemplary of such departures are noncritical variations of the shapes of component parts of the vehicle; the use of substitute, for preferred, materials of construction in the manufacture of said parts; the elimination of certain structural, or other, features of the vehicle not critically essential to its proper use and functioning; the addition of useful, but noncritical, components to the vehicle; etc.

More specific illustrations of permissible modifications of water sport vehicle 10 within the scope of my invention include such changes as the substitution of a suitably rugged plastic wheel and vehicle frame for metal wheel 12 and frame 14; the substitution of a styrofoam, or other buoyant member, for pneumatic tube 28; the substitution of a completely pneumatic wheel for the illustrated wheel-tube combination; the substitution of an equivalent part for the illustrated handlebar, ski hanger, or other component of the vehicle; and other modifications of similarly noncritical character.

I wish to emphasize, in final summary, that the scope of my invention includes all of its variant forms in addition to that shown and specifically described herein.

I claim:

1. A water sport vehicle comprising, in combination:
   buoyant wheel means rotatably mounted in relatively lightweight frame means;
   towrope receiving means to which a towrope can be attached for vehicle pulling purposes;

a pair of runners pivotally supported either side of said wheel means; and handhold means;

the parts of said vehicle cooperably serving to permit a rider to stand on said runners, astraddle the wheel means, and grip said handhold means with his hands as the vehicle is towed through the water by a motor boat;

to permit the towed vehicle, with said rider aboard, to roll across the water on said wheel means, when traveling at a planing speed;

to assure clearance of the water surface by said runners when they are held horizontally at said planing speed; and to permit said rider to dip the rear end of either of said runners into the water, when the vehicle is traveling at said planing speed, for speed and direction control purposes.

2. A water sport vehicle in accordance with claim 1, in which:

said buoyant wheel means comprises a relatively lightweight wheel with a buoyant tire mounted thereon;

said towrope receiving means comprises a towbar fixedly secured to said lightweight frame means so as to extend outwardly therefrom, in a direction of alignment with said wheel; and said handhold means comprises a handlebar;

said runners being supported either side of said buoyant wheel means by a pair of hangers integral with, and downwardly dependent from, said frame means either side of said wheel, and a pair of angled runner-support members pivotally secured to said hangers and adapted to permit swinging movement of said runners in substantially parallel planes either side of said wheel means.

3. A water sport vehicle in accordance with claim 2, having a fender sized to protect said rider from the direct force of water spray thrown up by said tube, yet permit the escape of a roostertail of water spray therebehind, when the vehicle is traveling across the water at said planing speed.

4. A water sport vehicle accordance with claim 3, in which said runners are water skis and said hangers are provided with stop means for preventing pivotal movement of said angled support members beyond certain predetermined limits of travel.

5. A water sport vehicle in accordance with claim 4, in which said buoyant tire is a pneumatic tube.

6. A water sport vehicle in accordance with claim 5, in which said tube is molded with transeverse wrinkles around its tread surface to provide improved traction of the wheel on said water when the vehicle is traveling thereacross at said planing speed.

7. A water sport vehicle in accordance with claim 4, in which said stop means for preventing pivotal movement of said angled support members beyond their predetermined limits of travel comprises a pair of protruding pins anchored in each of said hangers in positions either side of each of said angled support members.

8. A water sport vehicle in accordance with claim 2, in which said handlebar has a handgrip at each end.

9. A water sport vehicle in accordance with claim 2, in which said handlebar is provided with an elongate extension and said extension is pivotally connected to said towbar, near the forward end of the latter, to permit up and down movement of said handlebar, yet substantially restrict its lateral movement (relative to the towbar), by said rider, when the vehicle is traveling at said planing speed.

10. A water sport vehicle in accordance with claim 6, in which said handlebar is provided with an elongate extension and said extension is pivotally connected to said towbar, near the forward end of the latter, to permit up and down movement of said handlebar, yet substantially restrict its lateral movement (relative to the towbar), by said rider, when the vehicle is traveling at said planing speed.

References Cited

UNITED STATES PATENTS

| | | | |
|---|---|---|---|
| 1,104,229 | 7/1914 | Szegel | 115—19 |
| 1,777,698 | 10/1930 | Lofstrand | 9—310 |
| 3,336,038 | 8/1967 | Cohen | 9—310X |

MILTON BUCHLER, Primary Examiner

P. E. SAUBERER, Assistant Examiner

U.S. Cl. X.R.

115—19